United States Patent Office 2,730,127
Patented Jan. 10, 1956

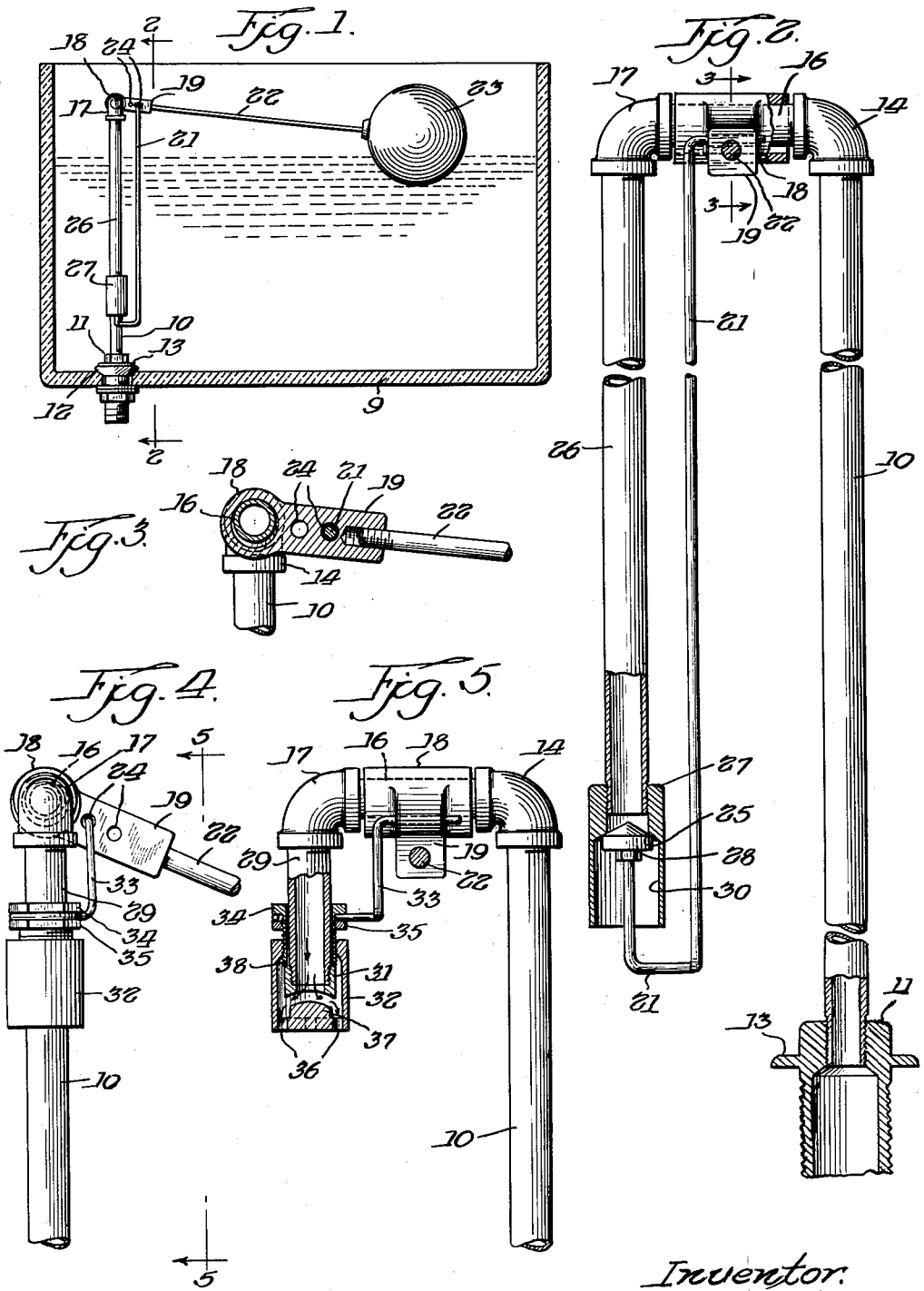
Jan. 10, 1956 — G. E. HANSEN — 2,730,127
TANK FILLING VALVE
Filed Nov. 3, 1950
Inventor:
George E. Hansen
By Joseph O. Lang, Atty.

2,730,127

TANK FILLING VALVE

George E. Hansen, Chicago, Ill., assignor to Crane Co., Chicago, Ill., a corporation of Illinois Application November 3, 1950, Serial No. 193,955

2 Claims. (Cl. 137—591)

This invention pertains to a valve structure. More particularly, it pertains to a tank filling valve, preferably employing the conventional float ball valve actuating means, although it will be apparent that it may be used with other forms of actuating mechanisms.

An important object of this invention is to provide a valve which automatically responds to liquid flow thereby to maintain a predetermined liquid level within a tank.

It is another object of this invention to provide an automatically operating tank filling valve which is comparatively simple in construction and is economical to manufacture.

Other objects and advantages will become more readily apparent upon proceeding with the following description read in light of the accompanying drawings, in which, Fig. 1 is a side elevation view of a preferred embodiment of this invention mounted within a tank.

Fig. 2 is a partially sectioned magnified view taken on line 2—2 of Fig. 1.

Fig. 3 is a fragmentary sectional view taken on a line 3—3 of Fig. 2.

Fig. 4 is a side elevation fragmentary view of a modification of this invention.

Fig. 5 is a partially sectioned view taken on a line 5—5 of Fig. 4.

Similar reference numerals refer to similar parts throughout the several views.

As shown in Fig. 1, a preferred embodiment of the valve is shown located within a tank 9, such as a closet tank or the like. The valve preferably consists essentially of a liquid inlet pipe 10 having a base 11 which is threaded onto the lower end of the pipe 10 and is also threaded for the purpose of providing a suitable fluid-tight connection through the tank bottom as illustrated. Obviously, as will hereinafter be more apparent, the base 11 could also connect through a side wall of the tank 9 by merely eliminating the upper bend in the pipe 10. The base 11 may be provided with a rubber gasket 12 to insure the fluid tight seal between the tank 9 and a shoulder portion 13 of the base 11.

As shown more clearly in Fig. 2, the upper end of the pipe 10 is threadedly engaged with an elbow fitting 14 from which a conventional pipe nipple 16 extends to engage another oppositely disposed elbow fitting 17. Intermediate the elbows, a sleeve member 18 is positioned which is loosely mounted on the nipple 16 so as to be free to rotate thereon as apparent in the sectional view of Fig. 3. An integral sleeve extension 19 extends laterally from the sleeve 18 to connect with a lever or other suitable valve actuating rod 21 and a float rod 22. The latter rod 22 threadedly engages the end of the extension 19 to extend axially therefrom and connect to a float ball 23, as shown in Fig. 1.

Thus, it will be clear that as the ball 23 is influenced in its vertical position by the level of the liquid within the tank 9, the sleeve 18, being rotatably mounted on nipple 16, is free to rotate and thereby provides a pivot for the sleeve extension 19. Since the rod 21 is pivotally connected to and depends from the extension 19, it will now be apparent that movement of the latter member produces axial displacement of the rod 21.

As shown in Figs. 3 and 4, the extension 19 may be provided with predeterminately located holes 24 which separately receive the upper hooked end of the actuating rod 21. Thus, the leverage of the rod 21 about the sleeve 18 may be conveniently adjusted, thereby effecting the desired valve seating force.

Depending from the elbow 17 is an outlet pipe 26, which is shown in Fig. 1 to extend substantially parallel to the rod 21. It is apparent in Fig. 2 that the lower end of the pipe 26 is threaded into a sleeve 27 which contains the valve seat 25. A valve seat closure member 28 is shown in Fig. 2 to be mounted on the upwardly curved lower end of the actuating rod 21 and is received within the sleeve 27 to cooperate with the valve seat and to thereby selectively interrupt fluid flow through the valve upon the rise and fall of liquid within the tank.

It should be noted that the sleeve 27 is formed with a lower counterbore 30 above which the valve seat 25 is located. Liquid is then permitted to flow around the closure member 28 and within the counterbore 30 in the valve open position, since the member 28 is of a smaller diameter than that of the counterbore 30. However, the closure 28 is guided within the lower counterbore portion of the sleeve 27 to prevent substantial transverse movement of the member 28.

With the foregoing description of the valve construction, it will be clear that considerable lateral movement of the rod 22 and corresponding rocking of sleeve 18 may be present without affecting the seating closure 28, since the rod 21 will essentially be pivoting about the pipe 26 and closure 28. This arrangement, of course, permits a relatively loose and inexpensive fit of the sleeve 18 on the pipe nipple 16 without loss of fluid tightness of the closed valve (see Fig. 3). Such construction is easy to maintain and will operate with a minimum of bearing frictional load.

A modification of the valve closure construction is shown in Figs. 4 and 5. An outlet pipe 29, corresponding to the pipe 26 of the previous figures, is provided with a cylindrical seat member 31 which preferably is threadedly received over the lower end of the depending pipe 29. Around this entire seat assembly, a cup-like sleeve member 32 is provided which connects to an actuating rod 33 having an adjusting screw 34 threadedly engaging the sleeve to telescope therewith. The screw 34 is preferably provided with a nut 35 which is threadedly applied in abutting relation to clamp the rod 33 between the screw head and the nut, as shown. The lower surface of the sleeve 32 is provided with a plurality of apertures constituting the outlets 36, and has an integral closure member 37 in the center thereof to cooperate with the valve seat 31, thereby to interrupt liquid passing through the pipe 29 and flowing in the direction indicated by the arrows.

An actuating means is employed in connection with the instant modification which is similar in principle to that described above. Thus, it will be apparent that the sleeve 32 with its closure portion 37 is movable on the pipe 29 to selectively interrupt liquid flow through the valve. The member 31 may be shouldered, as shown at 38 in Fig. 5, thus limiting the downward movement of the sleeve 32. The adjusting screw 34 may be predeterminately threaded with the sleeve 32 and thus regulate the lift or seating force applied by the lever to the closure member.

Although this invention has been described in specific forms, it should not be so limited, as it is susceptible to numerous changes without departing from the spirit thereof and the scope of the appended claims.

I claim:

1. A tank filling valve comprising a casing of substantially inverted U-construction, one leg of the U-casing comprising the inlet and the other leg comprising the outlet of the valve, a sleeve-like closure member reciprocally movable relative to the outlet leg and positioned at a lower end limit thereof, actuating means for the said closure member, a hollow seat for the said closure member cooperating with an end portion of the outlet leg of the said casing, the said actuating means including a hollow sleeve member surrounding the casing portion which connects the legs of the U-construction and being rotatable about said portion to actuate the said closure member, the said closure member including a hollow cylindrical portion surrounding an outer surface of the leg of the outlet of the casing adjacent said hollow seat and being telescopically movable over the said hollow seat to interrupt fluid flow therepast upon predetermined reciprocal movement of said closure member, the said hollow cylindrical portion having pivotal means hingedly cooperating with the hollow sleeve member of said actuating means to reciprocate said cylindrical portion of the closure member upon rotation of said hollow sleeve member of the actuating means.

2. A tank filling valve comprising a casing of substantially inverted U-construction, one leg of the U-construction comprising the inlet and the other leg comprising the outlet of the said casing, a closure member reciprocally movable relative to the outlet leg and being telescopically positioned over a lower end limit thereof, actuating means therefor, the said actuating means including a hollow sleeve member surrounding the casing portion which connects the legs of the U-construction and being rotatable about said portion to actuate the closure member, a substantially tubular seat with a transverse annular surface portion for receiving the said closure member and enclosing a lower end portion of the outlet leg of the said casing, the said closure member including an annular portion movable over an outer surface of the leg constituting the outlet of the casing to enclose said seat and being movable over the said seat to permit and interrupt fluid flow past the seat transverse portion upon predetermined reciprocal movement of said closure member, the said closure member annular portion including annular guide means for said closure member having a bell crank rod for hinged attachment to said actuating means.

References Cited in the file of this patent

UNITED STATES PATENTS

| | | |
|---|---|---|
| 382,301 | Hansen | May 8, 1888 |
| 608,897 | McPortland | Aug. 9, 1898 |
| 645,662 | Emery | Mar. 20, 1900 |
| 1,408,192 | Gunn | Feb. 28, 1922 |
| 1,442,206 | Witherspoon | Jan. 16, 1923 |
| 1,997,977 | Petersen | Apr. 16, 1935 |
| 2,333,767 | Davis | Nov. 9, 1943 |
| 2,367,951 | Lewis | Jan. 23, 1945 |
| 2,488,457 | Wallner | Nov. 15, 1949 |
| 2,598,195 | Smith | May 27, 1952 |

FOREIGN PATENTS

| | | |
|---|---|---|
| 886 | Great Britain | 1884 |
| 76,122 | Germany | July 9, 1894 |